(12) United States Patent
Zhang et al.

(10) Patent No.: US 7,689,203 B2
(45) Date of Patent: Mar. 30, 2010

(54) METHOD FOR IMPLEMENTING ROAMING CHARGING AND SYSTEM THEREOF

(75) Inventors: Wenlin Zhang, Guangdong (CN); Xiaoqin Duan, Guangdong (CN); Yajuan Wu, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 635 days.

(21) Appl. No.: 11/589,422

(22) Filed: Oct. 30, 2006

(65) Prior Publication Data

US 2007/0111705 A1    May 17, 2007

Related U.S. Application Data

(63) Continuation of application No. PCT/CN2005/000606, filed on Apr. 29, 2005.

(30) Foreign Application Priority Data

Apr. 30, 2004    (CN) .................. 2004 1 0038837

(51) Int. Cl.
*H04M 11/00* (2006.01)
*H04W 4/00* (2009.01)
(52) U.S. Cl. ..................... 455/406; 455/432.1
(58) Field of Classification Search .......... 455/406
See application file for complete search history.

(56) References Cited

U.S. PATENT DOCUMENTS 6,188,911 B1 * 2/2001 Wallentin et al. ......... 455/524
6,650,886 B1 * 11/2003 Lundstrom ............... 455/406
7,043,241 B1 * 5/2006 Sladek et al. ............ 455/432.3
7,116,968 B2 * 10/2006 Koskinen et al. ......... 455/406
2004/0185826 A1 * 9/2004 Koskinen et al. ......... 455/406
2005/0113091 A1 * 5/2005 Rodriguez et al. ....... 455/436

FOREIGN PATENT DOCUMENTS

| WO | WO99/16267 | 4/1999 |
|----|-----------|--------|
| WO | WO01/10109 | 2/2001 |

* cited by examiner

*Primary Examiner*—Lester Kincaid
*Assistant Examiner*—Yu (Andy) Gu
(74) *Attorney, Agent, or Firm*—Finnegan, Henderson, Farabow, Garrett & Dunner LLP

(57) ABSTRACT

The present invention discloses a method for implementing roaming charging, including: a proxy CRF is configured in the PLMN; a terminal uses bearer resources or packet data services in the currently visited PLMN to provide information for selecting charging rules for the home CRF through the proxy CRF in the PLMN, the home CRF selects the charging rules according to the information and provides the charging rules for the TPF serving the current terminal. The present invention also provides a system for implementing roaming charging, which includes a TPF, a home CRF in the terminal's home PLMN and a proxy CRF in the PLMN other than the terminal's home PLMN. When the terminal is roaming and utilizing the bearer resources or packet data services in the currently visited PLMN, the problem of addressing among the functions when implementing the data flow based charging procedure based on FBC mechanism is solved.

14 Claims, 3 Drawing Sheets

METHOD FOR IMPLEMENTING ROAMING CHARGING AND SYSTEM THEREOF

This application is a continuation of International Application No. PCT/CN05/00606, filed Apr. 29, 2005, which claims priority to Chinese Patent Application No. 200410038837.1, filed Apr. 30, 2004.

FIELD OF THE TECHNOLOGY

The present invention relates to charging area, more particularly to a method for implementing packet data service roaming charging and a system thereof.

BACKGROUND OF THE INVENTION

With the packet data service being more and more widely applied, how to charge the packet data service accurately and reasonably has become a general concern to which the operators are paying more and more attention.

In the current General Packet Radio Service (GPRS) charging system, service data flow of the terminal can be recognized only at the level of Access Point Name (APN) and Packet Data Protocol Context (PDP Context), so the charging has to be performed according to the APN and the PDP Context. However, in practical application, multiple parallel service data flows will probably be carried through the same PDP Context, and different services may need different charging manners. The current GPRS charging system cannot satisfy this requirement. For instance, when the terminal has both flow media service and multimedia message service at the same time and these two services are borne in the same APN and PDP Context, but different charging rules are applied to charge these two services, say flow media service needs to be charged according to the terminal's data flow or service duration, while multimedia message service needs to be charged according to the events like sending or receiving a multimedia message. In order to utilize the same charging scheme upon different types of packet data services, it is needed to put forward a new charging manner for the current GPRS charging system and introduce a general flow based charging mechanism.

Considering the above situation, the 3rd Generation Partnership Project (3GPP) is discussing how to implement the IP-based data Flow Based Charging (FBC) currently. As to just one packet data service, the consumed data flow when the terminal is utilizing this service is called Service Data Flow (SDF) that can be the aggregation of multiple IP data flows. Multiple different packet data services can be borne in one APN and PDP Context. In this way, the charging fineness based on IP flow is much higher than that based on one PDP Context, and the IP-based FBC can truly reflect the resource occupied status of a certain service data flow. Therefore, IP-based FBC can provide more abundant charging means for the operators or service providers.

The system configuration, function requirements and information interworking procedure of the FBC are all described in 3GPP. FIG. 1A shows the FBC system configuration for the online charging, in which a Customized Application for Mobile Network Enhanced Logic (CAMEL) based Service Control Point (SCP) 101 and a Service Data Flow Based Credit Control Function (CC) 102 constitute an Online Charging System (OCS) 106. CC 102 is connected through the Ry interface with a Service Data Flow Based Charging Rule Function (CRF) 103, CRF 103 is connected through the Rx interface with an Application Function (AF) 104 and through the Gx interface with a Traffic Plane Function (TPF) 105; CC 102 is connected through the Gy interface with TPF 105.

FIG. 1B shows the FBC system configuration for the offline charging. A CRF 103 is connected through the Rx interface with an AF 104 and through the Gx interface with a TPF 105, TPF 105 is connected through the Gz interface with a Charging Gateway Function (CGF) 107 and with a Charging Collection Function (CCF) 108, respectively.

According to the definition of the FBC function entities in 3GPP, the function of each function entity will be described hereinafter.

TPF 105 is a function for bearing packet data flow and can differentiate packet data packages that belong to different packet data service flows. TPF 105 is used for collecting offline charging information and executing online credit control. When the bearer of packet data flow is changed, for example, in the case of bearer establishment, bearer modification, bearer deletion or other procedures, TPF 105 will request CRF 103 through the Gx interface for the charging rules and the charging rules request message may carry the terminal-related information, the bearer characteristic, network-related information and etc. The terminal-related information may be the Mobile Station International Integrated Services Digital Network (ISDN) Number (MSISDN), the International Mobile Subscriber Identifier (IMSI) and etc, the bearer characteristic related information may be the Quality of Service (QoS) parameter, the network-related information may be the Mobile Network Code (MNC), the Mobile Country Code (MCC) and etc. TPF 105 performs packet data filtering and charging information collecting upon the corresponding packet data flow according to the charging rules returned by CRF 103. A TPF 105 may be provided with services by one or more CRF 103. When there are multiple CRF 103 providing services for a same TPF 105, a corresponding CRF 103 may be selected according to the terminal's identifier to interact with this TPF 105. TPF 105 supports the predefined charging rules and the predefined packet data flow filter.

CRF 103 is a function for storing the charging rules which supports both dynamic and static charging rules. Dynamic charging rules are generated in real time according to the charging strategy of the packet data service and applied to the corresponding packet data flow, while static charging rules are invariable through the utilized course of the packet data service by the terminal and may be activated dynamically by some events during the utilized course of the packet data service by the terminal. CRF 103 may select proper charging rules according to the information provided by TPF 105, AF 104 or OCS 106. When TPF 105 requests CRF 103 for the charging rules or when a specific event occurs, CRF 103 will provide the selected charging rule for TPF 105. One CRF 103 may correspond to multiple TPF 105.

AF 104 represents all application-related functions. AF 104 may be a network entity of an operator or that of a third part service provider. AF 104 provides the corresponding information for CRF 103, so that CRF 103 can select or configure corresponding charging rules according to this information. The information provided by AF 104 for CRF 103 includes: identifier information of the packet data flow, information for selecting the charging rules, application/service identifier, triggered events for the application/service charging rules, type of the packet data flow, rate of the packet data flow and etc. The identifier information of the packet data flow may be wildcarded; the type of the packet data flow may be video, audio and etc. Either the type of the packet data flow or the rate of the packet data flow is the optional parameter.

One AF 104 may correspond to multiple CRF 103. When there are multiple CRF 103 corresponding to a same AF 104, the corresponding CRF 103 can be selected according to the terminal identifier to interact with AF 104.

CC 102 is a function for executing credit control, which is applied only to online charging system and may be implemented by adding new functions to the existing OCS 106. CC 102 in OCS 106 may provide relevant information for selecting the charging rules to CRF 103 through the Ry interface.

CGF 107/CCF 108 is a function applied to offline charging system and may be implemented by following the existing means in GPRS charging system.

If the bearer network is a GPRS network, TPF 105 is a Gateway GPRS Support Node (GGSN) and AF 104 is a service gateway or service server in the Packet Data Network (PDN). When the IP Multimedia Subsystem (IMS) is borne in the GPRS network, AF 104 is a Proxy Call Session Control Function (P-CSCF) and CRF 103 is a newly added logic entity.

As described above, the charging configuration and the functions implemented by the function entities may also be applied to 3GPP2 network frameworks.

In the existing charging methods based on the FBC mechanism, the TPF selects the serving CRF according to the terminal identifier and the AF addresses the serving CRF according to the terminal identifier as well. As the TPF is a function belonging to the bearer layer while the AF is a function belonging to the application layer, and a terminal may have different identifiers in different layers, the above-described terminal identifier at the AF and that at the TPF may be the same or different. By means of network layout and configuration, it is guaranteed that the same CRF can be addressed according to a same terminal's different identifiers in different layers.

According to the existing addressing means based on the FBC mechanism, only when the TPF, the CRF and the AF are located in a same Public Land Mobile Network (PLMN) can the TPF and the AF address the same CRF in terms of a same terminal, thus implement the correct CRF addressing. If the terminal utilizes a TPF located in a PLMN other than the terminal's home PLMN, it is still a pending problem in the FBC mechanism as how to make the TPF address the correct CRF according to the terminal identifier, obtain the required charging rules and thus implement packet data flow based charging. In addition, when the AF and the CRF are located in different PLMN, the AF is unable to address the CRF serving the corresponding terminal currently according to the terminal identifier by means of the existing addressing method.

SUMMARY OF THE INVENTION

The present invention provides a method for implementing roaming charging and a system for implementing roaming charging, so that the terminal can be charged while utilizing the bearer resources or packet data services in the currently visited PLMN.

The method for implementing roaming charging includes the following steps:

configuring a proxy CRF in a PLMN, wherein the proxy CRF is used for interchanging charging related information with the CRF in another PLMN;

providing information for selecting charging rules for the proxy CRF in the currently visited PLMN, forwarding, by the proxy CRF, the information for selecting the charging rules to a terminal's home CRF, wherein the terminal is using bearer resources or packet data services in the currently visited PLMN;

selecting, by the terminal's home CRF, charging rules according to the received information;

providing, by the terminal's home CRF, the charging rules for a TPF which collects charging information according to the charging rules.

The system for implementing roaming charging includes: a TPF, a terminal's home CRF in the terminal's home PLMN and a proxy CRF in the PLMN other than the terminal's home PLMN; the terminal's home CRF is connected to the proxy CRF and is used for selecting the charging rules; the TPF is connected to the terminal's home CRF or the proxy CRF and is used for collecting charging information according to the charging rules.

According to the scheme provided by the present invention, the terminal utilizes the bearer resources or packet data services in VPLMN when roaming. When the TPF or the AF in the VPLMN is addressing, after confirming that the terminal identifier is not allocated by the current VPLMN, the TPF or the AF will directly select a V-CRF preconfigured for this TPF or AF to serve the terminal and provide this V-CRF with relevant information for selecting the charging rules, and then the V-CRF sends the received relevant information for selecting the charging rules to the H-CRF so that H-CRF can determine the current charging rules according to the received information. Therefore, in the FBC mechanism, when the terminal is roaming and during the procedure of data flow based charging, the addressing problem among the various functions is solved.

Besides, through the scheme provided by the present invention, when the terminal utilizes the bearer resources or packet data services of VPLMN, the FBC-based charging can be implemented as long as there are functions supporting the FBC mechanism in the VPLMN. Therefore, when the terminal is roaming, various charging means and various flexible charging strategies may be applied to implement a proper and reasonable charging for the terminal, thus more terminal users may be attracted to use the packet data services; the scheme provided by the present invention has good compatibility so that the existing GPRS charging mechanism will not be affected even if the VPLMN does not support the FBC-based charging.

DETAILED DESCRIPTION OF THE INVENTION

The embodiments according to the present invention will be described in detail hereinafter with reference to the accompanying drawings.

As a CRF is a function for storing the charging rules in the FBC mechanism, the establishment and selection of the charging rules need to be negotiated and specified in advance by the operators and service providers; moreover, considering different types of terminal users, such as prepaid users and postpaid users, when the same packet data service is utilized, the CRF may select different charging rules for each terminal. Therefore, the CRF is a function with adscription concept and the interaction with the CRF is needed to obtain some information related to the terminal and the charging mode. In this way, when the terminal is roaming, according to the agreement among the operators, the terminal's current visited PLMN (VPLMN) needs to distribute a visited CRF to provide services for this roaming terminal; furthermore, the visited CRF is connected to the home CRF, so that the visited CRF can interact with the home CRF for the relevant information for selecting the charging rules.

In the present invention, as for the terminal, the CRFs in different PLMNs are divided into the terminal's Home CRF (H-CRF) and the terminal's Visited CRF (V-CRF). An H-CRF is a CRF for storing terminal information and charging mode related information, connected to a V-CRF. A V-CRF is located in the terminal's currently visited PLMN while an H-CRF is located in the terminal's Home PLMN (HPLMN). If the terminal is roaming and is utilizing the bearer resources or packet data services in a VPLMN, namely that the VPLMN is different from the HPLMN, when addressing, after confirming that the terminal identifier is not allocated by the present network VPLMN, the TPF or the AF in the VPLMN will directly selects the preconfigured V-CRF to service this terminal, and the configuring rule may be based on the terminal identifier, the network access point information, say Access Point Name (APN) information, or other relevant information; and then the TPF or the AF provides this V-CRF with relevant information for selecting the charging rules, the V-CRF sends the received relevant information for selecting the charging rules to the H-CRF, so that the H-CRF can determine the current charging rules according to the information. The V-CRF configured in the VPLMN for the AF and that for the TPF may be the same or different.

During the procedure of issuing the charging rules to the TPF, according to the agreement among different PLMNs, the V-CRF may negotiate with the H-CRF for the charging rules and, according to the charging rules indication from the H-CRF and the charging rules preset by the VPLMN, determine proper charging rules and issue the charging rules to the TPF, the TPF then collects charging information according to the charging rules provided by the V-CRF.

Figure 1A:
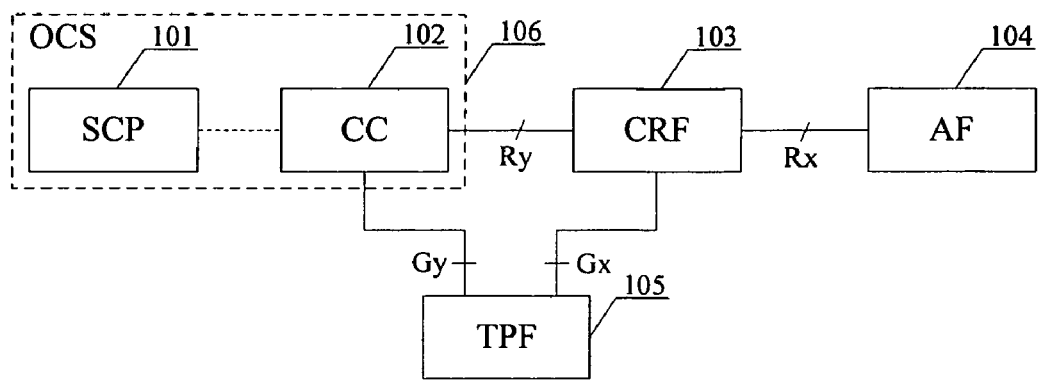
FIG. 1A is a schematic diagram illustrating the configuration of an online charging FBC system.
Figure 1B:
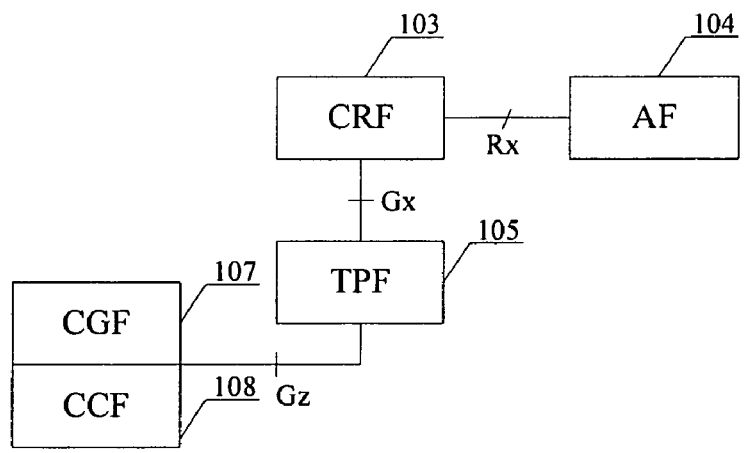
FIG. 1B is a schematic diagram illustrating the configuration of an offline charging FBC system.
Figure 2:
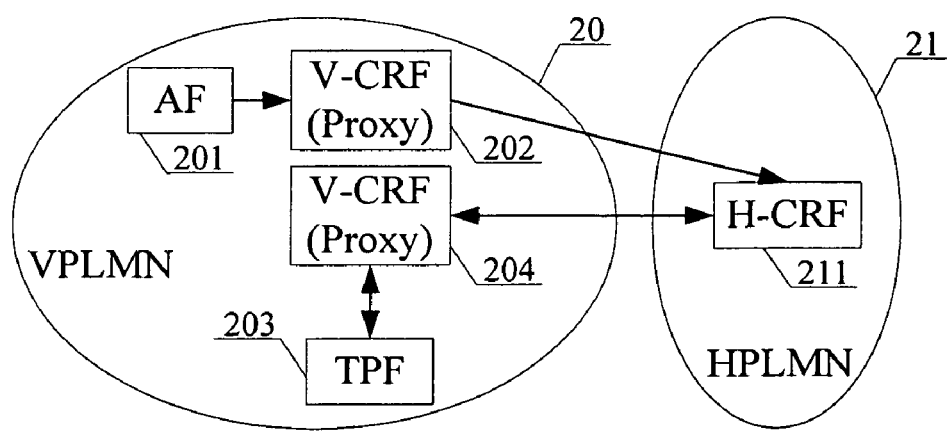
FIG. 2 is a schematic diagram illustrating the implementation of roaming charging according to an embodiment of the present invention.

FIG. 2 is a schematic diagram illustrating the implementation of roaming charging according to an embodiment of the present invention. As shown in FIG. 2, AF 201 and TPF 203 are located in VPLMN 20, in VPLMN 20, V-CRF 204 is configured for TPF 203 as the proxy CRF that provides service for the terminals belonging to other PLMNs, and V-CRF 201 is configured for AF 201 as the proxy CRF that provides service for the terminals in other PLMNs. V-CRF 201 and V-CRF 204 may be the same CRF or different CRF. The above-mentioned proxy CRF, say V-CRF 201 and V-CRF 204, is not only the proxy CRF interchanging with the CRF in other PLMN, but also the CRF that can provide services for the terminals belonging to this VPLMN 20. The terminal is a home terminal in HPLMN 21 and H-CRF 211 in HPLMN 21 stores the terminal information and charging mode related information.

The terminal is located in VPLMN 20 currently and uses TPF 203 in VPLMN 20, after confirming that the terminal's home PLMN is not PLMN 20 according to the terminal identifier, TPF 203 sends V-CRF 204 the relevant information for selecting the charging rules which may be bearer-related information. According to the agreement between VPLMN 20 and HPLMN 21, V-CRF 204 determines the terminal's HPLMN 21 according to the terminal identifier and then forwards the relevant information for selecting the charging rules to H-CRF 211 in HPLMN 21.

When the terminal needs to utilize AF 201 in VPLMN 20, the terminal sends a packet data service request to AF 201, AF 201 receives the packet data service request, confirms that the terminal's home PLMN is not PLMN 20 according to the terminal's identifier, and then sends V-CRF 202 the relevant information for selecting the charging rules which may be the application layer related information. According to the agreement between VPLMN 20 and HPLMN 21, V-CRF 202 determines the terminal's HPLMN 21 according to the terminal identifier, and then forwards the relevant information for selecting the charging rules to H-CRF 211 in HPLMN 21.

The terminal identifier generally includes relevant information of the terminal's home PLMN, therefore, the TPF or the AF may determine whether the terminal belongs to a PLMN according to the terminal's identifier, and the V-CRF may also determine the terminal's HPLMN according to the terminal's identifier.

After H-CRF 211 receives the relevant information for selecting the charging rules forwarded by V-CRF 204, V-CRF 202 or V-CRF 204 and V-CRF 202, if it is online charging, H-CRF may also receive information from Online Charging System (OCS), H-CRF 211 selects proper charging rules according to the above-mentioned information and then sends the selected charging rules to V-CRF 204. After receiving the charging rules provided by H-CRF 211, V-CRF 204 may further modify the charging rules provided by H-CRF 211 according to the charging strategy of VPLMN 20 to generate new charging rules and then send the charging rules to TPF 203. According to the charging rule provided by V-CRF 204, TPF 203 performs packet data filtering and charging information collecting upon the corresponding packet data flow.

Furthermore, if the terminal sends the service request to the AF after the bearer is established, when H-CRF 211 receives the application/service related information forwarded by V-CRF 202, if H-CRF 211 already knows that TPF 203 utilizes V-CRF 204 in VPLMN 20 currently, thus, according to the agreement among different PLMNs and specific network implementation, H-CRF 211 may also forward the address information of V-CRF 204 through V-CRF 202 to the AF. In this way, subsequent process of selecting the charging rules may be executed by V-CRF 204, and V-CRF 204 may select proper charging rules according to the relevant information for selecting the charging rules received from AF 201 and TPF 203, rather than requesting H-CRF 211 for the charging rules every time.

V-CRF 202 or V-CRF 204 may be directly connected to H-CRF 211 through an interface, which is used for sending relevant information for selecting the charging rules; a Gateway CRF (G-CRF) may also be set in VPLMN 20 and HPLMN 21, thus V-CRF 202 and V-CRF 204 are connected to the G-CRF in VPLMN 20, H-CRF 211 is connected to the G-CRF in HPLMN 21, and finally the G-CRF in VPLMN 20 is connected to the G-CRF in HPLMN 21.

In practical application when the terminal utilizes packet data service, the terminal may utilize the TPF in the VPLMN and the AF in the HPLMN; or utilizes the TPF and the AF in the VPLMN; or utilizes the TPF in the HPLMN and the AF in the VPLMN. The above-mentioned various situations will be illustrated in detail hereinafter.

Figure 3:
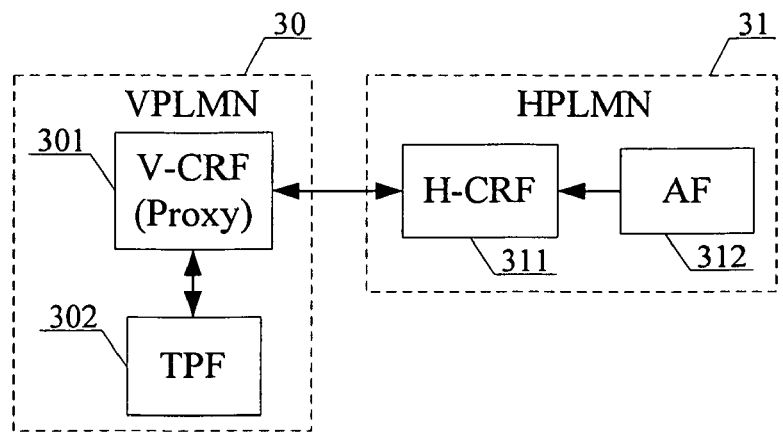
FIG. 3 is a schematic diagram illustrating the implementation of roaming charging according to the first embodiment of the present invention.

FIG. 3 is a schematic diagram illustrating the implementation of roaming charging according to an Embodiment One of the present invention, as shown in FIG. 3, in this embodiment, the terminal utilizes TPF 302 in VPLMN 30 and AF 312 in HPLMN 31 and V-CRF 301 is configured for TPF 302 as the proxy CRF providing services for the terminals in other PLMNs, according to the agreement between VPLMN 30 and HPLMN 31, V-CRF 301 in VPLMN 30 and H-CRF 311 in HPLMN 31 are connected to each other, say connected directly or connected through G-CRF, the specific procedure of implementing roaming charging includes the following steps:

Step A1: after receiving the bearer establishment request which is from the bearer layer and is initiated by the terminal, TPF 302 determines the terminal's home PLMN is not PLMN 30 according to the terminal's identifier, requests V-CRF 301 that is preconfigured for TPF 302 as the proxy CRF for the charging rules and simultaneously provides relevant information for selecting the charging rules, such as the bearer-related information. If TPF 302 determines that the terminal's home PLMN is PLMN 30, TPF 302 will directly request the terminal's home CRF for the charging rules.

Step A2: after receiving the charging rules request form TPF 302, V-CRF 301 determines that the terminal's home PLMN is PLMN 31 according to the terminal's identifier, then forwards the charging rules request to H-CRF 311 and provides the relevant information for selecting the charging rules.

Step A3: after receiving the charging rules request, according to the relevant information for selecting the charging rules provided by TPF 302, and probably the relevant information for selecting the charging rules provided by AF 312 as well, and probably the information from OCS in the case of online charging, H-CRF 311 selects the proper charging rules and then sends the selected charging rules to V-CRF 301.

Step A4: after receiving the charging ruled provided by H-CRF 311, V-CRF 301 may further modify the charging rules provided by H-CRF 311 according to the charging strategy of VPLMN 30 to generate new charging rules and then send the charging rules to TPF 302. According to the charging rules provided by V-CRF 301, TPF 302 performs packet data filtering and charging information collecting upon the corresponding packet data flow.

Step A5: AF 312 receives the packet data service request sent by the terminal and determines that the terminal's home PLMN is PLMN 31 according to the terminal's identifier, as AF 312 is located in the terminal's home PLMN 31, AF 312 directly sends the application/service related information for selecting the charging rules to H-CRF 311.

Step A6: after receiving the application/service related information provided by AF 312, H-CRF 311 selects proper charging rules according to the application/service related information and then sends the selected charging rules to V-CRF 301.

Step A7: after receiving the charging rules provided by H-CRF 311, V-CRF 301 may further modify the charging rules provided by H-CRF 311 according to the charging strategy of VPLMN 30 to generate new charging rules and then send the charging rules to TPF 302. TPF 302 performs packet data filtering and charging information collecting upon the corresponding packet data flow according to the charging rules provided by V-CRF 301.

When the bearer is changed or the terminal utilizes a new packet data service, the procedure is the same as that described above, which will not be further illustrated repeatedly herein.

Figure 4:
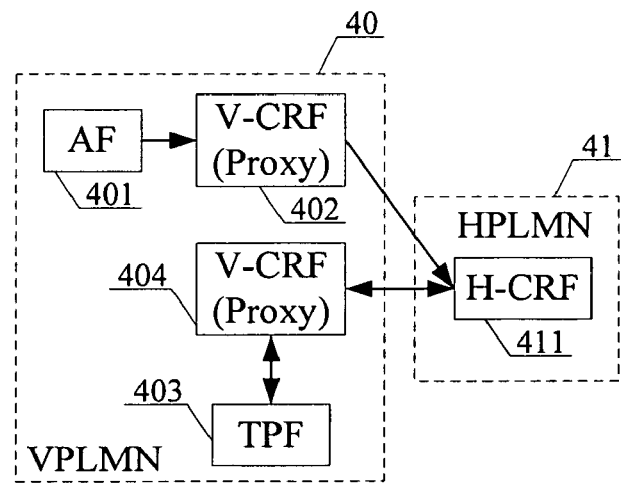
FIG. 4 is a schematic diagram illustrating the implementation of roaming charging according to a second embodiment of the present invention.

FIG. 4 is a schematic diagram illustrating the implementation of roaming charging according to an Embodiment Two of the present invention, as shown in FIG. 4, in this embodiment, the terminal utilizes TPF 403 and AF 401 in VPLMN 40, and V-CRF 404 is configured for TPF 403 as the proxy CRF providing services for the terminals in other PLMNs and V-CRF 402 is configured for AF 401 providing services for the terminals in other PLMNs, according to the agreement between VPLMN 40 and HPLMN 41, V-CRF 402 and V-CRF 404 in VPLMN 40 are connected to H-CRF 411 in HPLMN 41, respectively, say connected directly or connected through G-CRF, the specific procedure of implementing roaming charging includes the following steps:

Step B1: after receiving the bearer establishment request that is from the bearer layer and is initiated by the terminal, TPF 403 determines the terminal's home PLMN is not PLMN 40 according to the terminal's identifier, requests V-CRF 404 that is preconfigured for TPF 403 as the proxy CRF for the charging rules and simultaneously provides relevant information for selecting the charging rules, such as the bearer-related information.

Step B2: after receiving the charging rules request from TPF 403, V-CRF 404 determines that the terminal's home PLMN is PLMN 41 according to the terminal's identifier, and then forwards the charging rules request to H-CRF 411 and provides the relevant information for selecting the charging rules.

Step B3: after receiving the charging rules request, according to the relevant information for selecting the charging rules provided by TPF 403, and probably the relevant information for selecting the charging rules provided by AF 401 as well, and probably the information from OCS in the case of online charging, H-CRF 411 selects the proper charging rules and then sends the selected charging rules to V-CRF 404.

Step B4: after receiving the charging rules provided by H-CRF 411, V-CRF 404 may further modify the charging rules provided by H-CRF 411 according to the charging strategy of VPLMN 40 to generate new charging rules and then send the charging rules to TPF 403. According to the charging rules provided by V-CRF 404, TPF 403 performs packet data filtering and charging information collecting upon the corresponding packet data flow.

Step B5: AF 401 receives the packet data service request sent by the terminal and determines that the terminal's home PLMN is not PLMN 40 according to the terminal's identifier, then sends the application/service related information for selecting the charging rules to V-CRF 402, which is preconfigured for AF 401 as the proxy CRF.

Step B6: after receiving the application/service related information, V-CRF 402 determines that the terminal's home PLMN is PLMN 41 according to the terminal's identifier and then forwards the application/service related information for selecting the charging rules to H-CRF 411.

Step B7: after receiving the application/service related information provided by AF 401, H-CRF 411 selects the proper charging rules according to the application/service related information and then sends the selected charging rules to V-CRF 404.

Step B8: after receiving the charging rules provided by H-CRF 411, V-CRF 404 may further modify the charging rules provided by H-CRF 411 according to the charging strategy of VPLMN 40 to generate new charging rules and then send the charging rules to TPF 403. According to the charging rules provided by V-CRF 404, TPF 403 performs packet data filtering and charging information collecting upon the corresponding packet data flow.

When the bearer is changed or the terminal utilizes a new packet data service, the procedure is the same as that described above, which will not be further illustrated repeatedly herein.

Figure 5:
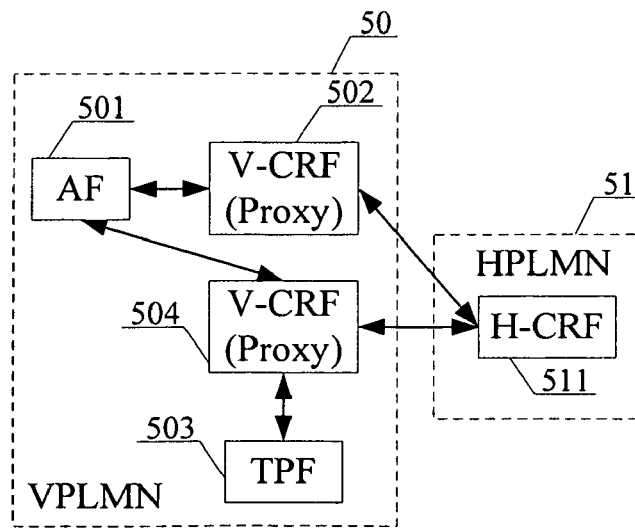
FIG. 5 is a schematic diagram illustrating the implementation of roaming charging according to a third embodiment of the present invention.

FIG. 5 is a schematic diagram illustrating the implementation of roaming charging according to an Embodiment Three of the present invention, as shown in FIG. 5, in this embodiment, the terminal utilizes TPF 503 and AF 501 in VPLMN 50, V-CRF 504 is configured for TPF 503 as the proxy CRF providing services for the terminals in other PLMNs and V-CRF 502 is configured for AF 501 providing services for the terminals in other PLMNs, according to the agreement between VPLMN 50 and HPLMN 51, V-CRF 502 and V-CRF 504 in VPLMN 50 are connected to H-CRF 511 in HPLMN 51, respectively, say connected directly or connected through G-CRF, the specific procedure of implementing roaming charging includes the following steps:

Step C1: after receiving the bearer establishment request that is from the bearer layer and is initiated by the terminal, TPF 503 determines the terminal's home PLMN is not PLMN 50 according to the terminal's identifier, requests V-CRF 504 that is preconfigured for TPF 503 as the proxy CRF for the charging rules and simultaneously provides relevant information for selecting the charging rules, such as the bearer-related information.

Step C2: after receiving the charging rules request form TPF 502, V-CRF 504 determines that the terminal's home PLMN is PLMN 51 according to the terminal's identifier, and then forwards the charging rules request to H-CRF 511 and provides the relevant information for selecting the charging rules.

Step C3: after receiving the charging rules request, according to the relevant information for selecting the charging rules provided by TPF 503, and probably the relevant information for selecting the charging rules provided by AF 501 as well, and probably the information from OCS in the case of online charging, H-CRF 511 selects the proper charging rules and then sends the selected charging rules to V-CRF 504.

Step C4: after receiving the charging rules provided by H-CRF 511, V-CRF 504 may further modify the charging rules provided by H-CRF 511 according to the charging strategy of VPLMN 50 to generate new charging rules and then send the charging rules to TPF 503. According to the charging rules provided by V-CRF 504, TPF 503 performs packet data filtering and charging information collecting upon the corresponding packet data flow.

Step C5: AF 501 receives the packet data service request sent by the terminal and determines that the terminal's home PLMN is not PLMN 50 according to the terminal's identifier and then sends the application/service related information for selecting the charging rules to V-CRF 502, which is preconfigured for AF 501 as the proxy CRF.

Step C6: after receiving the application/service related information, V-CRF 502 determines that the terminal's home PLMN is PLMN 51 according to the terminal's identifier and then forwards the application/service related information for selecting the charging rules to H-CRF 511.

Step C7: after receiving the application/service related information provided by AF 501, H-CRF 511 selects the proper charging rules according to the application/service related information and then sends the selected charging rules to V-CRF 504.

Step C8: after receiving the charging rules provided by H-CRF 511, V-CRF 504 may modify the charging rules provided by H-CRF 511 according to the charging strategy of VPLMN 50 to generate new charging rules and then send the charging rules to TPF 503. According to the charging rules provided by V-CRF 504, TPF 503 performs packet data filtering and charging information collecting upon the corresponding packet data flow.

Step C9: if the bearer is already established before the terminal sends packet data service request to AF 501, when H-CRF 511 receives the application/service related information provided by AF 501, H-CRF 511 already knows the address information of V-CRF 504 corresponding to TPF 503, therefore, through the address information of V-CRF 504 provided by V-CRF 502 for AF 501, AF 501 is notified that the subsequent selection of charging rules will be performed by V-CRF 504.

Step C10: after receiving the address information of V-CRF 504 forwarded by V-CRF 502, when receiving the new packet data service request sent by the terminal, AF 501 sends the application/service related information to V-CRF 504 directly according to the address information of V-CRF 504. According to the application/service related information provided by AF 501, V-CRF 504 selects the proper charging rules and then sends the charging rules to TPF 503. According to the charging rule provided by V-CRF 504, TPF 503 performs packet data filtering and charging information collecting upon the corresponding packet data flow.

When the bearer is changed or the terminal utilizes a new packet data service, the procedure is the same as that described above, which will not be further illustrated repeatedly herein.

Figure 6:
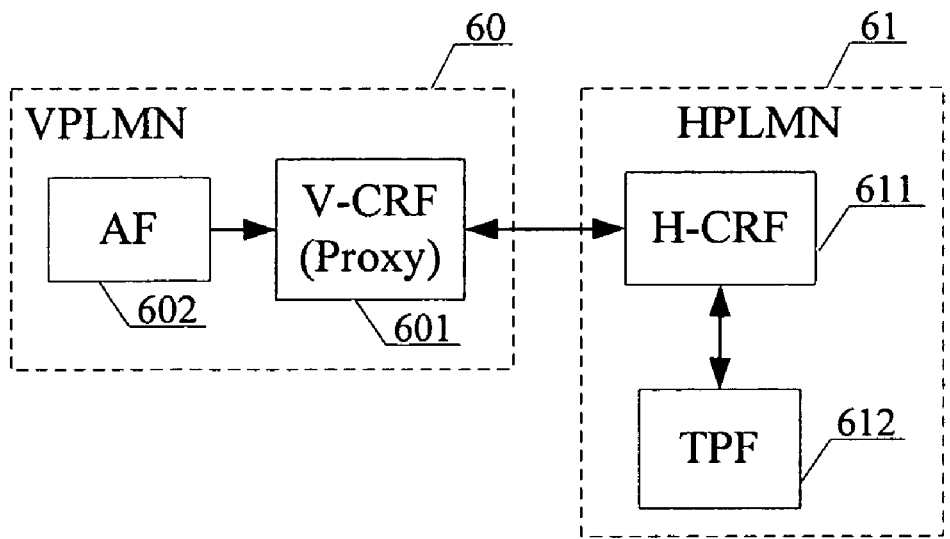
FIG. 6 is a schematic diagram illustrating the implementation of roaming charging according to a fourth embodiment of the present invention.

FIG. 6 is a schematic diagram illustrating the implementation of roaming charging according to an Embodiment Four of the present invention, as shown in FIG. 6, in this embodiment, the terminal utilizes TPF 612 in HPLMN 61 and AF 602 in VPLMN 60, and V-CRF 601 is configured for AF 602 as the proxy CRF providing services for the terminals in other PLMNs, according to the agreement between VPLMN 60 and HPLMN 61, V-CRF 601 in VPLMN 60 and H-CRF 611 in HPLMN 61 are connected to each other, say connected directly or connected through G-CRF, the specific procedure of implementing roaming charging includes the following steps:

Step D1: after receiving the bearer establishment request that is from the bearer layer and is initiated by the terminal, TPF 612 determines the terminal's home PLMN is PLMN 61 according to the terminal's identifier, as TPF 612 is located in HPLMN 61, TPF 612 directly requests H-CRF 611 for the charging rules and simultaneously provides relevant information for selecting the charging rules, such as the bearer-related information.

Step D2: after receiving the charging rules request, according to the relevant information for selecting the charging rules provided by TPF 612, and probably the relevant information for selecting the charging rules provided by AF 602 as well, and probably the information from OCS in the case of online charging, H-CRF 611 selects the proper charging rules and then sends the selected charging rules to TPF 612. According to the charging rules provided by H-CRF 611, TPF 612 performs packet data filtering and charging information collecting upon the corresponding packet data flow.

Step D3: after receiving the packet data service request sent by the terminal and determining that the terminal's home PLMN is not PLMN 60 according to the terminal's identifier, AF 602 sends the application/service related information for selecting the charging rules to V-CRF 601, which is preconfigured for AF 602 as the proxy CRF.

Step D4: after receiving the application/service related information, V-CRF 601 determines that the terminal's home PLMN is PLMN 61 and then forwards the application/service related information for selecting the charging rules to H-CRF 611.

Step D5: after receiving the application/service related information provided by AF 602, H-CRF 611 selects proper charging rules according to the application/service related information and then sends the selected charging rules to TPF 612. According to the charging rules provided by H-CRF 611, TPF 612 performs packet data filtering and charging information collecting upon the corresponding packet data flow.

When the bearer is changed or the terminal utilizes a new packet data service, the procedure is the same as that described above, which will not be further illustrated repeatedly herein.

When the bearer network is a GPRS network, the TPF is a GGSN and an AF in the same network can be identified by Access Point Name (APN) in a GPRS network, that means that the TPF acting as a GGSN can address an AF according to the APN obtained in the bearer layer, therefore, according to the adscription and configuration of the APN, the operators can make the TPF select an AF that sends service data flows using a currently established bearer.

Furthermore, to make this TPF and the AF select a same CRF, the APN concept may be utilized as well. The operator configures a CRF to service a certain APN domain or some APN domains, the TPF can determine a CRF according to the obtained APN and the AF in the APN's located network can also visit this CRF according to the operator's configuration, thus the AF and TPF in the same network can select the same proxy CRF. The above-mentioned APN may be regarded as the network assess point, therefore, this selecting method may also be applied to the networks of other types, in this case, the APN may be the network access point used in other networks, such as Network Access Identifier (NAI).

This method of making TPF and AF address the same CRF through APN configuration may be applied either individually or cooperatively with the terminal identifier as forementioned. For instance, in some cases, in order to simplify the APN configuration, the terminal identifier may be further considered to determine a CRF.

In the schemes for implementing the addressing through the APN, to make the operator's configuration simple and flexible, the TPF and the AF are usually located in the same network, therefore, only the situation when the TPF and the AF are located in the same network will be analyzed herein, but it doesn't mean that the situation when TPF and AF are located in different networks is not supported, through the operator's configuration, it can also be achieved that the TPF and the AF are located in different networks.

The first processing means: both the AF and the TPF are located in the terminal's currently visited PLMN, the TPF selects a CRF according to the APN when the bearer is established, wherein, the selected CRF is the one in the PLMN where the TPF is located or which is currently visited by the terminal, according to the operator's configuration. During the course of the session establishment, according to the operator's configuration, the AF interacts with a specified CRF when utilizing service data flow based charging, and at this time, the CRF having been selected by the TPF according to the APN is selected, and the rest part of the procedure is similar to that as forementioned.

The second processing means: both the AF and the TPF are located in the terminal's home PLMN, the TPF selects a CRF according to the APN when the bearer is established, wherein, the selected CRF is the one in the PLMN where the TPF is located and which the terminal belongs to, according to the operator's configuration. During the course of the session establishment, according to the operator's configuration, the AF interacts with a specified CRF when utilizing service data flow based charging, and at this time, the CRF having been selected by the TPF according to the APN is selected, and the rest part of the procedure is similar to that as forementioned.

The third processing means: both the AF and the TPF are located in the terminal's currently visited PLMN, the TPF selects a CRF according to the APN when the bearer is established, wherein, the selected CRF is the one in the PLMN which the terminal belongs to, according to the operator's configuration. During the course of the session establishment, according to the terminal's identifier, the AF determines that the served terminal is not the one in the current PLMN, thus according to the operator's configuration and the terminal's identifier, when utilizing service data flow based charging, the AF finds the terminal's home PLMN and interacts with a CRF specified by the home PLMN, and at this time, the CRF having been selected by the TPF according to the APN is selected, and the rest part of the procedure is similar to that as forementioned.

Figure 7:
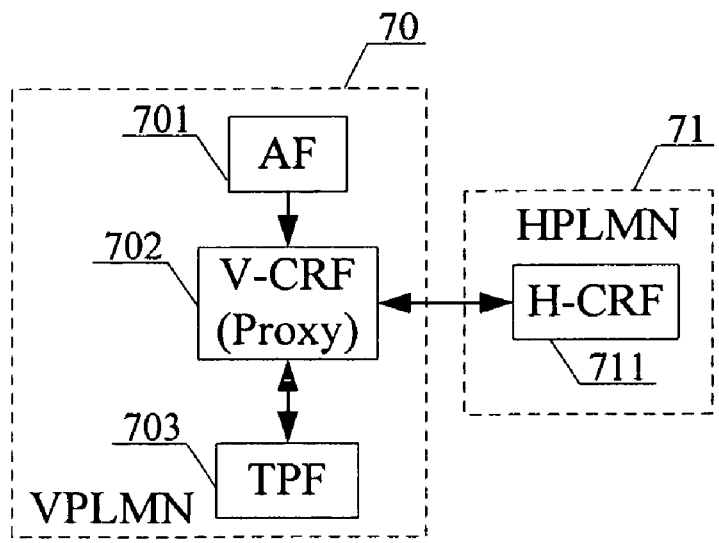
FIG. 7 is a schematic diagram illustrating the implementation of roaming charging according to a fifth embodiment of the present invention.

FIG. 7 is a schematic diagram illustrating the implementation of roaming charging according to an Embodiment Five of the present invention, as shown in FIG. 7, in this embodiment, the terminal utilizes TPF 703 and AF 701 in VPLMN 70, and the same V-CRF 702 is configured for both TPF 703 and AF 701 as the proxy CRF providing services for the terminals in other PLMNs, according to the agreement between VPLMN 70 and HPLMN 71, V-CRF 702 in VPLMN 70 and H-CRF 711 in HPLMN 71 are connected to each other, say connected directly or connected through G-CRF, the specific procedure of implementing roaming charging includes the following steps:

Step E1: after receiving the bearer establishment request that is from the bearer layer and is initiated by the terminal, TPF 703 determines according to the terminal's identifier that the terminal's home PLMN is not PLMN 70, therefore, in the case of GPRS network, TPF 703 may request V-CRF 702 preconfigured for TPF 703 as the proxy CRF for the charging rules according to the obtained APN information, and simultaneously provides relevant information for selecting the charging rules, such as the bearer-related information.

Step E2: after receiving the charging rules request from TPF 703, V-CRF 702 determines according to the terminal's identifier that the terminal's home PLMN is PLMN 71, and then forwards the charging rules request to H-CRF 711 and provides the relevant information for selecting the charging rules.

Step E3: after receiving the charging rules request, according to the relevant information for selecting the charging rules provided by TPF 703, and probably the relevant information for selecting the charging rules provided by AF 701 as well, and probably the information from OCS in the case of online charging, H-CRF 711 selects the proper charging rules and then sends the selected charging rules to V-CRF 702.

Step E4: after receiving the charging rules provided by H-CRF 711, V-CRF 702 may further modify the charging rules provided by H-CRF 711 according to the charging strategy of VPLMN 70 to generate new charging rules and then send the charging rules to TPF 703. According to the charging rules provided by V-CRF 702, TPF 703 performs packet data filtering and charging information collecting upon the corresponding packet data flow.

Step E5: AF 701 receives the packet data service request sent by the terminal and determines according to the terminal's identifier that the terminal's home PLMN is not PLMN 70. Therefore, in the case of GPRS network, according to the APN information, the AF may send the application/service related information for selecting the charging rules to the V-CRF 702 that is preconfigured for the AF as the proxy CRF.

Step E6: after receiving the application/service related information, V-CRF 702 determines according to the terminal's identifier that the terminal's home PLMN is HPLMN 71 and then forwards the application/service related information for selecting the charging rules to H-CRF 711.

Step E7: after receiving the application/service related information provided by AF 701, H-CRF 711 selects proper charging rules according to the application/service related information and then sends the selected charging rules to V-CRF 702.

Step E8: after receiving the charging rules provided by H-CRF 711, V-CRF 702 may further modify the charging rules provided by H-CRF 711 according to the charging strategy of VPLMN 70 to generate new charging rules and then send the charging rules to TPF 703. According to the charging rules provided by V-CRF 702, TPF 703 performs packet data filtering and charging information collecting upon the corresponding packet data flow.

When the bearer is changed or the terminal utilizes a new packet data service, the procedure is the same as that described above, which will not be further illustrated repeatedly herein.

The above-illustrated reasons for determining that the terminal's home network is not the current network may be: being unable to identify the terminal identifier; or obtaining the terminal's home PLMN according to the MNC/MCC code section in the terminal's MSISDN; or obtaining the terminal's home PLMN as network1 according to the Uniform Resource Locator (URL) based on Session Initiation Protocol (SIP), such as user@network1.com and etc.

The above-mentioned different PLMNs may be those following the same standard but covering different areas, such as the Code Division Multiple Access (CDMA) communications network covering Beijing area and the CDMA communications network covering Shanghai area; or said PLMNs may also be those following different standards but covering the same area, such as the CDMA communications network and the Wideband CDMA (WCDMA) communications network covering Guangdong area; or said PLMNs may be those following different standards and covering different areas, such as the WCDMA communications network covering Beijing area and the CDMA communications network covering Shanghai area.

The above-mentioned embodiments are only the preferred embodiments of the present invention, and not used to confine the protection scope of the present invention, it is apparent that various changes, substitution of equivalent parts and improvements can be made within the scope of the present invention as defined by the appended claims.

What is claimed is:

1. A method for implementing roaming charging, comprising the steps of:
    configuring a proxy Charging Rule Function (CRF) in a Public Land Mobile Network (PLMN), wherein the proxy CRF is used for interchanging charging related information with the CRF in another PLMN;
    providing information for selecting charging rules for the proxy CRF in the currently visited PLMN;
    forwarding, by the proxy CRF, the information for selecting the charging rules to a terminal's home CRF, wherein the terminal is using bearer resources or packet data services in the currently visited PLMN;
    selecting, by the terminal's home CRF, charging rules according to the received information; and
    providing, by the terminal's home CRF, the charging rules for a Traffic Plane Function (TPF) which collects charging information according to the charging rules,
    wherein:
        configuring the proxy CRF in the PLMN comprises:
            configuring a proxy CRF for the TPF and/or an Application Function (AF) in the terminal's currently visited PLMN, wherein the proxy CRF is used for interchanging charging related information with the CRF in other PLMN;
        if it is determined according to a terminal identifier that the terminal's home PLMN is the terminal's currently visited PLMN, providing the terminal's home CRF with the information for selecting the charging rules; and
        if it is determined according to a terminal identifier that the terminal's home PLMN is not the terminal's currently visited PLMN, providing the proxy CRF with the information for selecting the charging rules.

2. The method according to claim 1, wherein:
    the proxy CRF is configured for the TPF in the terminal's currently visited PLMN; and
    after receiving a bearer request sent by the terminal, the TPF in the terminal's currently visited PLMN requests the configured proxy CRF for the charging rules and provides the configured proxy CRF with the relevant information for selecting the charging rules, and the proxy CRF forwards the information for selecting the charging rules to the terminal's home CRF.

3. The method according to claim 2, wherein, before the terminal's home CRF provides the charging rules for the TPF which provides service for the terminal currently, further comprising:
    after receiving the packet data service request sent by the terminal, the Application Function (AF) in the terminal's home PLMN provides the information for selecting the charging rules for the terminal's home CRF.

4. The method according to claim 1, wherein,
    the proxy CRF is configured for the TPF and the AF respectively in the terminal's currently visited PLMN;
    if the terminal sends a bearer request to the TPF in the currently visited PLMN, after receiving the bearer request sent by the terminal, the TPF in the terminal's currently visited PLMN requesting the proxy CRF configured for the TPF for the charging rules and providing the information for selecting the charging rules, the proxy CRF configured for the TPF forwarding the information for selecting the charging rules to the terminal's home CRF;
    if the terminal sends a packet data service request to the AF in the currently visited PLMN, after receiving the packet data service request sent by the terminal, the AF in the terminal's currently visited PLMN providing the information for selecting the charging rules to the proxy CRF configured for the AF, the proxy CRF configured for the AF forwarding the information for selecting the charging rules to the terminal's home CRF.

5. The method according to claim 4, wherein, the proxy CRF configured for the TPF is the same as the proxy CRF configured for the AF.

6. The method according to claim 4, wherein, if the proxy CRF configured for the TPF is different from the proxy CRF configured for the AF, after the proxy CRF configured for the TPF forwards the information for selecting the charging rules to the terminal's home CRF, further comprising: the terminal's home CRF providing the AF through the proxy CRF configured for the AF with the address information of the proxy CRF configured for the TPF.

7. The method according to claim 1, wherein,
the proxy CRF is configured for the AF in the terminal's currently visited PLMN;
after receiving the packet data service request sent by the terminal, the AF in the terminal's currently visited PLMN providing the proxy CRF configured for the AF with the information for selecting the charging rules, the proxy CRF configured for the AF forwarding the information for selecting the charging rules to the terminal's home CRF.

8. The method according to claim 7, further comprising:
after receiving the bearer request sent by the terminal, the TPF in the terminal's home PLMN requesting the terminal's home CRF for the charging rules and providing the information for selecting the charging rules; the terminal's home CRF selecting the charging rules according to the received information; the terminal's home CRF providing the charging rules for the TPF that provides service for the terminal.

9. The method according to claim 1, further comprising:
if it is determined according to a terminal identifier that the terminal's home PLMN is the terminal's currently visited PLMN, requesting the terminal's home CRF for the charging rules;
if it is determined according to a terminal identifier that the terminal's home PLMN is not the terminal's currently visited PLMN, requesting the configured proxy CRF for the charging rules.

10. The method according to claim 1, wherein the procedure of providing the information for selecting charging rules for the proxy CRF comprises: finding the configured proxy CRF according to a terminal identifier or network access point information, and providing the information for selecting the charging rules for the proxy CRF.

11. The method according to claim 1, wherein, the procedure of the proxy CRF forwarding the information for selecting the charging rules to the terminal's home CRF comprises: the proxy CRF finding the terminal's home CRF according to a terminal identifier and forwarding the information for selecting the charging rules to the terminal's home CRF.

12. The method according to claim 1, further comprising:
the terminal's home CRF sending the selected charging rules to the proxy CRF configured for the TPF, and the proxy CRF sending the selected charging rules to the TPF.

13. The method according to claim 12, further comprising: the proxy CRF, according to the charging strategy of the terminal's currently visited PLMN, modifying the charging rules provided by the terminal's home CRF to generate new charging rules before sending the selected charging rules to the TPF.

14. The method according to claim 1, further comprising: the TPF collecting the charging information according to the charging rules and charging the terminal after the terminal's home CRF providing the charging rules for the TPF which provides service for the terminal currently.

* * * * *